United States Patent [19]

Satoh et al.

[11] Patent Number: 4,684,564

[45] Date of Patent: Aug. 4, 1987

[54] HEAT-LAMINATING COMPOSITE FILM AND LAMINATED MATERIAL USING THE SAME

[75] Inventors: Kenji Satoh, Tondabayashi; Isao Kaneshige; Kyoichiro Ikari, both of Kurashiki, all of Japan

[73] Assignee: Kuraray Co., Ltd., Kurashiki, Japan

[21] Appl. No.: 731,927

[22] Filed: May 8, 1985

[30] Foreign Application Priority Data

May 14, 1984 [JP] Japan .................................. 59-97362
May 16, 1984 [JP] Japan .................................. 56-99451

[51] Int. Cl.$^4$ .............................................. B32B 7/02
[52] U.S. Cl. .................................. 428/216; 428/349; 428/424.4; 428/518; 428/520
[58] Field of Search ..................... 428/424.4, 518, 522, 428/520, 216, 349

[56] References Cited

U.S. PATENT DOCUMENTS 2,891,876  6/1959  Brown et al. .................... 428/424.4
3,257,261  6/1966  Hochberg ........................ 428/424.4
4,552,801 11/1985  Odorzynski ......................... 428/522

FOREIGN PATENT DOCUMENTS 203043 11/1983 Japan .................................... 428/522
1489635 10/1977 United Kingdom .

*Primary Examiner*—Edith Buffalow
*Attorney, Agent, or Firm*—Kramer and Brufsky

[57] ABSTRACT

A heat-laminatable composite film obtained by providing, in sequence, a layer of a mixture of (B) a reactive polyurethane containing isocyanate groups therein and (C) a vinyl chloride-vinyl acetate copolymer on one surface of a film of (A) a saponified product of ethylene-vinyl acetate copolymer, or, Layer (B) and further Layer (C) on one surface of the film of (A). A laminated material obtained by heat-laminating the composite film onto at least one surface of a plasticized polyvinyl chloride layer.

The heat-laminatable composite film of the present invention is excellent in blocking resistance and adhesive strength. Further by heat-laminating the composite film onto the plasticized polyvinyl chloride layer, bleeding of the plasticizer in the polyvinyl chloride layer can be prevented.

13 Claims, No Drawings

HEAT-LAMINATING COMPOSITE FILM AND LAMINATED MATERIAL USING THE SAME

BACKGROUND OF THE INVENTION

1. Field of the Invention

The present invention relates to heat-laminating composite films comprising a layer of a saponified product of ethylene-vinyl acetate copolymer having a specific composition and two specific adhesives and comprising a specific construction, which are excellent in antiblocking properties and adhesion properties, have solved a problem of slippage and can be advantageously provided for practical use, and also to laminated materials using the same.

2. Description of the Prior Art

It is generally known that films or sheets of plasticized polyvinyl chloride, ordinarily called non-rigid polyvinyl chloride, hitherto employed, in industry contain plasticizer in large quantities more than about 25 wt%, in most cases, more than 30 wt%. For this reason, the sheets and the like encounter a serious drawback that the plasticizers bleed out of the surface when they have been extensively used. Therefore coating materials which coat the surface to eliminate the drawback have been deemed desirable.

When that non-rigid polyvinyl chloride sheet is used for, e.g. desk mat or paper holders, printing ink adheres to the non-rigid polyvinyl chloride sheets in an extremely short period of time when the sheet is brought into contact with reproduced documents by an electrostatic copying machine so that problems arise in that documents are obscured or the non-rigid polyvinyl chloride sheet is contaminated thus making reading-out of characters or the like on the printed surface impossible. Also in furniture, office fixtures, etc. prepared from or coated with so called vinyl chloride leather materials composed of non-rigid polyvinyl chloride or in wallpaper substantially composed of non-rigid polyvinyl chloride, etc., staining tends to occur due to bleeding the plasticizer out of the surface, which results in additional problems because such staining can be wiped out only with difficulty. Furthermore, films or sheets of non-rigid polyvinyl chloride have been advantageously employed as agricultural film or sheet for houses for crop cultivation, gardening facilities such as tunnels, multiples, etc., because of their excellent heat insulation property as compared to films or sheets of polyolefin or the like. However, the use of the films or sheets over a long term period results in drawbacks that plasticizers bleed out of the surface to stain so that transmission of light decreases, resulting in similar technical problems. Many attempts to improve the problem have been made but products which achieve the object and can be satisfactorily provided for practical use have not been found yet and, therefore films or sheets of non-rigid polyvinyl chloride free from bleeding of plasticizers out of the surface would be desirable.

On the other hand, an attempt to eliminate the drawback by laminating other thermoplastic film on a film or sheet comprising the non-rigid polyvinyl chloride has been also made. As laminating film for practical application, there is acrylic resin film capable of easily adhering to film or sheet consisting essentially of non-rigid polyvinyl chloride by the heat lamination process. However, no substantial effect of preventing bleeding of plasticizers has been attained. Other thermoplastic resins cannot be adhered to and coated onto films or sheets of non-rigid polyvinyl chloride through the heat lamination process which is easy, readily acceptable for manufacturers for films or sheets of the polyvinyl chloride type, technically most simple and easily adoptable, unless adhesives are used. From the foregoing situations, there is a strong desire for a heat-laminating composite film to which coating can be effected with a good adhesive force directly by the heat lamination process as with the foregoing acrylic resin, without requiring the manufacturers to use coating adhesives, and to give a composition in which bleeding of plasticizers can be prevented.

Further it is disclosed in Published Examined Japanese Patent Application No. 38103/78 that a biaxially stretched polyvinyl alcohol film having excellent water resistance property and free from occurrence of curling, wrinkling, etc. can be obtained by coating a solution of a blend of an isocyanate group-containing reactive polyurethane and a vinyl chloride-vinyl acetate copolymer in an organic solvent on a film of biaxially stretched polyvinyl alcohol type to form a coated layer and coating on the resulting coated layer an aqueous dispersion of a vinylidene chloride copolymer of a vinyl chloride-vinyl acetate copolymer. However, there is no disclosure that a heat-laminating composite film would be obtained by coating a solution of a blend of an isocyanate group-containing reactive polyurethane and a vinyl chloride-vinyl acetate copolymer in an organic solvent onto a saponified product of ethylene-vinyl acetate copolymer to form a heat-laminating composite film, or further that the composite film would be laminated onto a plasticized polyvinyl chloride film or sheet and that bleeding of a plasticizer in polyvinyl chloride can be prevented by such lamination.

SUMMARY OF THE INVENTION

As a result of extensive investigations on resistance to plasticizer, resistance to bleeding of plasticizer and staining due to external factors and cleaning of the staining, etc. of various thermoplastic films with plasticizers for many polyvinyl chlorides provided for practical use, the present inventors have found materials capable of imparting to a plasticized polyvinyl chloride layer (film or sheet) freedom from the aforesaid bleeding of plasticizer out of the surface and excellent resistance to staining, by providing a coated layer at least on one surface. They have also found that by the use of an adhesive showing a good adhesive strength to such materials and an adhesive different from the foregoing one showing a good adhesive strength to plasticized polyvinyl chloride film, etc., composite films showing no blocking property, overcoming slippage and capable of heat lamination can be obtained. Thus, the present invention has been accomplished.

Namely an object of the present invention is to provide heat-laminatable composite film comprising (A) saponified products of ethylene-vinyl acetate copolymer (hereafter referred to as EVOH) having an ethylene content of 20 to 60 mol% and a saponification degree of the vinyl acetate component of not less than 95%, (B) a reactive polyurethane containing isocyanate groups and (C) a vinyl chloride copolymer containing the vinyl chloride component of 60 to 99 mol% and a vinyl acetate component and/or a (meth)acrylate component of 40 to 1 mol%; and having a layer construction of either Layer A, Layer B and Layer C or Layer A and Layer of a mixture of B and C.

Another object of the present invention is to provide laminated material obtained by heat-laminating the composite film either Layer C or Layer of the mixture of B and C onto at least one surface of a layer (D) of plasticized polyvinyl chloride so as to contact Layer D with Layer C or Layer of the mixture of B and C.

DETAILED DESCRIPTION OF THE PREFERRED EMBODIMENTS

The most important elements of the heat-laminatable composite film in accordance with the present invention are adhesives (B) and (C) provided at one surface of EVOH (A). The adhesives must show good adhesion to EVOH and at the same time, have good adhesion also to supports to be heat-laminated, to inter alia, plasticized polyvinyl chloride. In addition, the thus coated EVOH film must have resistance to blocking properties and be good in slipping properties. Furthermore, after the composite film is obtained as heat-laminating composite film, the film must have a long-term shelf life (shelf life: allowable time period in which film is allowed to stand at normal temperature, without deterioration of efficiencies as heat-laminating composite film). The adhesives which are employed in the present invention are two adhesives of (B) a reactive polyurethane containing isocyanate groups and a vinyl chloride copolymer containing the vinyl chloride component of at least 60 mol%. It is one of the important features that layers comprising the adhesives be employed, while maintaining C in a thickness of at least 1μ, in such a construction that layers be in a laminated form of A/B/C.

As the vinyl chloride copolymer containing the vinyl chloride component of 60 to 99 mol%, a copolymer containing 70 to 95 mol% of the vinyl chloride component and 30 to 5 mol% of a vinyl acetate and/or (meth)acrylate component is preferred. As the vinyl acetate and/or (meth)acrylate component, there can be vinyl acetate alone, (meth)acrylate alone and a mixture of both components, among which the vinyl acetate component or the mixture is preferred. There can also be employed vinyl chloride copolymer containing these components which is modified with third component such as unsaturated organic acid, e.g. maleic acid, itaconic acid, etc. or anhydrides thereof, (meth)acrylic acid, etc. Of these, vinyl chloride copolymer modified with maleic anhydride is more preferred. This third component is preferably contained in an amount of 0.1 to 5 mol%. As solvent for the copolymers, methyl ethyl ketone, ethyl acetate, butyl acetate, etc. is preferred. As diluting agent, methyl ethyl ketone, toluene, etc. are preferably used.

Next, as the reactive polyurethane containing isocyanate groups, there are: substances obtained by mixing a high molecular weight substance containing at least two hydroxy groups in the molecule thereof (for example, high molecular weight substance such as polyester obtained by polycondensation of glycol, ethylene glycol, propylene glycol, diethylene glycol, glycerine, 1,3-butylene glycol, neopentyl glycol, trimethylolpropane, pentaerythritol, 1,6-hexamethylene glycol, sorbitol, butenediol, etc.) with saturated polybasic acid (adipic acid, phthalic anhydride, terephthalic acid, isophthalic acid, succinic acid, sebacic acid, azelaic acid, etc.); high molecular weight substance containing hydroxy groups in the molecule thereof obtained by partially saponifying copolymers of vinyl acetate and vinyl chloride; etc.); with compounds having at least two isocyanate groups in the molecule thereof (for example, reaction products of 2,4-toluylene diisocyanate (TDI), 4,4'-diphenylmethane diisocyanate (MDI), triisocyanate, hexamethylene diisocyanate or polyisocyanates with the aforesaid glycols; the reaction product of 1 mole of 1,6-hexamethylene glycol and 2 mols of TDI; the reaction product of 1 mol of trimethylolpropane and 3 mols of TDI, etc. As solvent for the reactive polyurethane containing isocyanate groups, there can be preferably employed ethyl acetate, butyl acetate, methyl ethyl ketone, toluene, xylene, etc. which are inert to the isocyanate groups.

In case that the aforesaid adhesive C is employed singly, namely, in case that the heat-laminatable composite films composed of Layer A/Layer C are constructed so as to contact Surface C with Surface A, no blocking property is noted and slipping property is also good, for example, in case that the films are rolled up to storage until the time of use. In addition, C shows good thermal adhesion property also to layers (sheets or films) consisting essentially of plasticized polyvinyl chloride, paper, etc. and are preferable. On the other hand, however, the adhesion proprty between A and C is poor and is insufficient for practical use, which is a fatally defective. On the other hand, the heat-laminating composite film composed of B alone and thus constructed with Layer A and Layer B provide both good adhesion properties between Layer A and Layer B and to layers consisting essentially of plasticized polyvinyl chloride, paper, etc. which are practically satisfactory; on the other hand, however, remarkable blocking properties are noted in case that Layer B is brought into contact with Layer A, for example, in the case of rolling the films up to store until the time of use, etc. and slipping properties are poor. Accordingly, serious obstacles are involved for practical use.

Only when the aforesaid adhesives B and C are used as a plurality of adhesive layers to Layer A in such a construction as Layer A/Layer B/Layer C and Layer C is laminated in a thickness of at least 1μ, preferably 1 to 10μ, the heat-laminating composite film of the present invention which is excellent in resistant to blocking and raises no problem in slipping property and provides a long term shelf life can be obtained. The thickness of Layer C must be at least 1 μm; when the thickness of Layer C is too small, resistance to blocking property and slipping property of the composite film having the construction of Layer A/Layer B/Layer C are not satisfactory. While the details are not exactly known it is assumed to be based on the aforesaid undesired properties of Layer B extended to Layer C. The thickness of Layer B is not overly limited but when it is too thin, a uniform coating over the entire surface, cannot be attained when it is too thick, economic disadvantage is invited. It is thus preferred that the thickness be in a range of 0.5 to 10μ, suitably 0.5 to several μ.

The shelf life of the composite film having the construction of Layer A/Layer B/Layer C obtained using the aforesaid two adhesives in such a manner that the thickness of Layer C be at least 1μ is long and, thermal adhesion property to films or sheets consisting essentially of plasticized polyvinyl chloride after storage over a long period of time, paper, etc. is sufficiently satisfactory for practical use.

The provision of a plurality of adhesive layers on Layer A can be effected by first coating B onto one surface of Layer A, drying the coated surface and then coating C on Surface B. The coating may be conducted in a conventional manner such as gravure coating, roll coating, doctor roll coating, doctor knife coating, bar coating, curtain flow coating, etc.

In the present invention, it is best to use B and C in independent layers as the adhesives used in the present invention; however, the adhesives may also be used as a layer of a B and C mixture. The mixing ratio (by weight ratio) of C/B in this case is ⅔ to 6, preferably 1 to 5. Unless the mixing ratio (weight) of C and B, C/B, is in the range of ⅔ to 6, to film which eliminates the foregoing drawbacks and is good both in resistance to blocking property and in slipping properties cannot be obtained. When C/B is smaller than ⅔, the resistance to blocking property is insufficient; when it exceeds 6, the adhesion property is unsatisfactory. In any case, shelf life is generally shortened and such is not preferred.

Coating of the adhesives (mixture of B and C) onto the EVOH film can be carried out in a conventional manner such as gravure coating, roll coating, doctor roll coating, doctor knife coating, bar coating, curtain flow coating, etc. It is preferred that the thickness of the adhesive layer composed of the mixture of C and B be in a range of 1 to 10μ.

EVOH which is used in the present invention has the ethylene content of 20 to 60 mol%, preferably 25 to 50 mol% and shows the saponification degree of the vinyl acetate component of not less than 95%.

Next, the heat-laminatable composite film of the present invention shows marked effects when it is laminated with films or sheets of plasticized polyvinyl chloride, namely, films or sheets of plasticized polyvinyl chloride containing plasticizer. This will be explained hereinafter.

As the plasticized polyvinyl chloride films or sheets, a polyvinyl chloride film or sheet containing 25 to 55 wt% of the following plasticizer, which is liquid at 20° C., based on the total weight, is used. As the plasticizer which is liquid at 20° C., there is phthalate type plasticizer such as dibutyl phthalate, di-2-ethylhexyl phthalate, diisooctyl phthalate,, diisodecyl phthalate, didecyl phthalate, dinonyl phthalate, dilauryl phthalate, butyllauryl phthalate, butylbenzyl phthalate, etc.; phosphate type plasticizer such as tricresyl phosphate, tributyl phosphate, tri-2-ethylhexyl phosphate, etc.; chlorine-containing plasticizer such as chlorinated paraffin , etc.; further plasticizer which is solid at ambient temperature, for example, dicyclohexyl phthalate, phthalate type plasticizer such as diester phthalate having carbon atoms for the alcohol of 13 or more; polyvalent alcohol plasticizer such as dipentaerythritol fatty acid esters, etc.; trimellitic acid plasticizer such as trioctyl trimellitate, etc. EVOH having the ethylene content of not more than 60 mol% and the saponification degree of not less than 95% shows resistance to plasticizer and provides resistance to the bleeding of these plasticizers. Ordinarily, such plasticizers are notoriously prone to bleeding, but the use of EVOH preferably having an ethylene content of not more than 55 mol%, more preferably not more than 50%, inhibits the bleeding of plasticizer.

As the ethylene content increases, resistance to bleeding of plasticizer gradually decreases; when the ethylene content is in the area exceeding 60 mol%, the bleeding of plasticizer onto the surface of non-rigid polyvinyl chloride laminates becomes noticeable and resistance to stain is also lowered. On the other hand, as the ethylene content decreases, the properties such as resistance to bleeding of plasticizer, etc. are more improved but at less than 20 mol%, water resistance property becomes poor and such is not preferred, because swelling of the surface may result or the surface may be impaired upon cleaning of stains due to merely external factors not related to bleeding of plasticizers, with, e.g., dustcloth, etc., not only in agricultural films or the like but also in the aforesaid desk mats, paper holders, wallpaper, etc. It is more preferred that the ethylene content be at least 25 mol%. EVOH of the present invention is sufficient if the ethylene content is in the area of 20 to 60 mol%, more preferably 25 to 50 mol%. EVOH may be those obtained by blending two or more EVOHs having different ethylene contents to obtain a value within this range. EVOH having the ethylene content of 20 to 60 mol% has water resistance property satisfactory for practical use and, on the other hand, because of another aspect that such EVOH is a hydrophilic polymer capable of maintaining equilibrated moisture in use, can prevent generation of static electricity so that dusts based on the static electricity do not adhere; from this viewpoint, such EVOH is preferred. Also form this viewpoint, it is more preferred that the ethylene content be less than 50 mol%. As a more excellent embodiment having further improved resistance to plasticizer and more improved resistance to bleeding of plasticizer and capable of further improving the water resistance property of the surface of the film, there is an advantageous embodiment in which the EVOH film used in the present invention is constructed in a plurality of EVOH layers comprising an EVOH layer having a higher ethylene content and an EVOH layer having a lower ethylene content. Namely, an embodiment in which EVOH having the ethylene content of 20 to 35 mol% which is excellent primarily in resistance to plasticizer, etc. is located at the location adjacent the adhesive layer, away from the surfaces of the composite EVOH film and, at the external surface, EVOH having the ethylene content of 40 to 60% having excellence in water resistance property is located, is more advantageous. The EVOH film having such two layer construction may be used by laminating two films of EVOH but, inter alia, a composite EVOH film having different properties in the surface and the back surface, which are obtained by integrating resin flows of two different kinds of EVOH in a melt state either inside or outside a die through co-extrusion operation is more advantageously employed. In this case, adhesive resin is unnecessary between the two EVOH layers and this embodiment is more preferred.

The resistance to plasticizer and other properties of EVOH are excellent. Therefore, the effects are exhibited even though the thickness is thin. However, when the thickness is extremely thin such as less than 5μ, damage due to scratching, etc. tends to occur. Furthermore, technical difficulty increases upon preparation of films free from pinholes in ordinary melt film-forming operation so that off-grade articles increase; such is not preferred. Further from viewpoints of preference in appearance and from necessity of decrease in luster, engraving of pattern, etc., the films are often subjected to embossing and in this case, it is preferred that the thickness of the EVOH film be thicker than at least 5μ. Further when the thickness of the EVOH film exceeds 50μ, such is not preferred since, not only economic disadvantage is invited but also its properties as a component of a non-rigid heat-laminated polyvinyl chloride sheet are adversely affected in, for example, causing the laminated product to have insufficient softness. The thickness of less than 40μ is more preferred.

The EVOH film may be in an unstretched or non-heat treated state, but from viewpoints of dimensional stability, water resistance property, etc., heat-treated ones are more preferred. The EVOH film has excellent embossing property as compared to other resins. The heat-laminatable composite films of the present invention are often subjected to embossing after laminate finishing, which is then advantageously used. In such a case, non-stretched EVOH film is more preferred. Further where water resistance property is required, at least a mono-axially stretched film, particularly a biaxially stretched film, is more preferred. In this case, it is advantageous that the magnification for stretching be more than 1.5 times in mono-axial stretching and in bi-axial stretching, more than 3 times, preferably more than 5 times, in area magnification.

Next, the process for heat-laminating the thus obtained composite film especially onto a plasticized polyvinyl chloride layer (film or sheet) will be explained. First, there is a process in which the composite film and the plasticized polyvinyl chloride layer are nipped between heat rolls heated at 120° to 160° C. to laminate. There is further a process in which the plasticized polyvinyl chloride layer preliminarily is heated to 120° C. or higher and the composite film are nipped between rolls to laminate (in this case, it is possible to cool and at the same time, emboss by the rolls). When embossing is conducted in the former process, the laminated material obtained by heating rolls is heated again and then nipped between rolls capable of embossing, thereby to cool and emboss simultaneously. When the temperature upon heat lamination is too low, adhesive force is somewhat insufficiently exhibited sometimes. When the temperature is too high, the surface state of EVOH sometimes results and such is not preferred.

The heat-laminatable composite film of the present invention is most advantageously employed as a heat-laminatable composite film to plasticized polyvinyl chloride film or sheet, as described above but also shows good thermal adhesion to interior materials substantially composed of paper, for example, base materials such as wallpaper, etc. The heat-laminatable composite film can provide excellent resistance to surface staining, cleaning property of the staining and excellent embossing of the EVOH layer, as a coating material for such articles substantially composed of paper and can be advantageously employed.

Next, the present invention will be explained referring to the examples but the scope of the present invention is not deemed to be limited thereto.

EXAMPLE 1

Onto an EVOH film having the ethylene content of 31 mol% and a saponification degree of the vinyl acetate component of 99.3% and a thickness of 15μ was first coated a solution of urethane type adhesive AD 335 A (polyester having OH groups at both terminals thereof) and hardener Cat-10 (aliphatic compound containing 3 isocyanate groups in the molecule thereof manufactured by Toyo Morton Co., Ltd.; mixing ratio of 17:1, which falls in B described above) in toluene/methyl ethyl ketone being ½ (weight ratio) having a solid content of 20 wt% in a thickness of 2 g/m² (solid basis). After drying at 110° C. for 1 minute, a solution of maleic anhydride-modified vinyl chloride-vinyl acetate copolymer adhesive MPR-TM (made by Nisshin Chemical Co., Ltd., which falls within C described above); modified vinyl chloride-vinyl acetate copolymer of vinyl chloride (86 mol%)-vinyl acetate (13 mol%)-maleic anhydride (1 mol%)) in toluene/methyl ethyl ketone being ½ (weight ratio) having a solid content of 20 wt% was further coated on the resulting coated surface in a thickness of 2 g/m² (solid basis) followed by drying under the same condition as described above. The thicknesses of Layer B and Layer C of the obtained composite film were 2.1μ and 2.0μ, respectively. In order to examine blocking property of the obtained, coated composite film, the EVOH film non-coated was closely contacted with Surface C of the coated composite film under pressure of 50 g/cm², which was allowed to stand for 24 hours and the stickiness generated thereafter was examined to determined if it was an obstacle for practical use. No stickiness was noted and no problem occurred with blocking property. Further, the slipping property of the coated composite film was also good. After 50 days lapsed, the coated composite film was laminated onto the surface of a non-rigid polyvinyl chloride sheet of 0.3 mm thick containing 38 wt% of di-2-ethylhexyl phthalate by a heat lamination process (using rolls heated at 150° C.). The adhesive strength was measured by T type peeling but the non-rigid polyvinyl chloride layer was destroyed and, it was confirmed that the coated composite film had sufficient adhesive strength. Onto the EVOH surface of the non-rigid polyvinyl chloride sheet on which the aforesaid coated composite film had been laminated was put an unplasticized, rigid polyvinyl chloride plate (6 cm×6 cm, 2 mm thick) in close contact. In a state where a load of 2 kg was applied to the rigid polyvinyl chloride plate, the amount of bleeding of plasticizer was examined at a temperature of 70° C. Even 50 hours after, neither increase in the weight of the rigid polyvinyl chloride plate nor stickiness at the EVOH surface was noted but the prevention of bleeding of the plasticizer was perfect. Even by wiping operation with wet dustcloth, the surface was not impaired but sufficient water resistance property was exhibited. For purpose of comparison, a coated film using AD 335 A and the above-mentioned hardener (mixing ratio of 17:1) or using MPR-TM and having the construction of A/B or A/C described above was obtained in a similar manner to described above. The coated film having the construction of A/B showed serious blocking property and poor slipping property, which would not be suitable for practical use as a heat-laminating film. The coated film having the construction of A/C showed satisfactory blocking property and slipping property but, after laminating the same onto the non-rigid polyvinyl chloride sheet described above, the adhesive strength was examined, where the adhesive strength between A and C was 0.28 kg/25 mm, showing insufficiency for practical use.

Further for purpose of comparison, a sheet obtained by heat-laminating a film of acrylic copolymer composed of 86 mol% of methyl methacrylate and 14 mol% of butyl vinyl acetate and having the same thickness as that of the aforesaid EVOH onto the aforesaid non-rigid polyvinyl choride sheet was subjected to the same test as described above. The change in weight of the rigid polyvinyl chloride plate after 24 hours was 3.2 wt%. It was confirmed that the weight change was based on the bleeding of the plasticizer. In addition, stickiness at the surface of the copolymer film was also noted.

EXAMPLE 2

A coated composite film was obtained in a manner similar to Example 1 except that an EVOH film having the ethylene content of 43 mol% and a saponification degree of the vinyl acetate component of 99.3% was used and the resulting coated composite film was subjected to heat lamination under the temperature condition of 130° C. and, the bleeding test of the plasticizer and the blocking property test, etc. were carried out, wherein the coated amount of Adhesive C was made about 1.2 g/m$^2$ so that the thickness of Layer C was 1.1μ.

The coated composite film showed good resistance to blocking property and the slipping property was also good. Further, no change in weight of the rigid polyvinyl chloride plate was noted. When the adhesive strength between the layers was measured with T type peeling, the non-rigid polyvinyl chloride layer was destroyed. Water resistance property of the EVOH surface was also good.

EXAMPLE 3

EVOH (X) having the ethylene content of 26 mol% and a saponification degree of the vinyl acetate component of 99.5% and EVOH (Y) having the ethylene content of 51 mol% and a saponification degree of the vinyl acetate component of 99.3 mol% were fed into two extruders, respectively. Using a T-die for a binary layer, melt resins were contacted within the die at 220° C. to obtain a composite EVOH film having a thickness of the EVOH (X) layer of 6μ and a thickness of the EVOH (Y) layer of 9μ. Surface X of the composite EVOH film was heat-laminated so as to contact with non-rigid polyvinyl chloride via a plurality of the adhesive layers in a manner similar to Example 1, which was then subjected to various tests. As adhesives, a methyl ethyl ketone solution of urethane adhesive EPS-703A (polyester having OH groups at the both terminals) and hardener KP-90 (compound containing 3 isocyanate groups in the molecule thereof made by Dai-Nippon Ink Co., Ltd., mixing ratio of 15:1, which falls within B described above) and MPR-TM used in Example 1 were employed and, the coated amounts were made 4 g/m$^2$ and 3 g/m$^2$, respectively so that the composite film had a thickness of Layer B of 3.9μ and a thickness of Layer C of 3.1μ. Further as a non-rigid polyvinyl chloride sheet, a non-rigid polyvinyl chloride sheet containing 35 wt% of a 50/50 (weight ratio) mixture of di-n-octyl phthalate and tri-2-ethylhexyl phosphate as a plasticizer was used and, heat lamination was carried out at the temperature of 125° C.

The obtained, coated composite film showed good resistance to blocking property and the slipping property was also good. The bleeding of the plasticizer was examined with a non-rigid polyvinyl chloride sheet having laminated thereon the composite film in a manner similar to Example 1. As a result, neither change in weight nor stickiness at the surface was noted. Further the adhesive strength between the layers was sufficient. When the adhesive strength was measured by T type peeling, the polyvinyl chloride layer was destroyed.

For purpose of comparison, the bleeding of the plasticizer was examined with the binary layer sheet obtained by heat-laminating the acrylic copolymer film used in Example 1 onto the non-rigid polyvinyl chloride sheet. The increase in weight of the rigid polyvinyl chloride plate was 3.1 wt% 30 hours after.

Further for purpose of comparison, a coated EVOH film having the construction of A/B obtained using EPS-703A and a hardener and KP-90 as adhesives was obtained. However, both blocking property and slipping property were poor and the composite film would not be suitable for practical use as a heat-laminating composite film.

EXAMPLE 4

A coated composite film was obtained in a manner similar to Example 1 except that a biaxially stretched (area stretching magnification of 3×3 times) EVOH film having the ethylene content of 49 mol% and a saponification degree of the vinyl acetate component of 99.2% was used and as a non-rigid polyvinyl chloride sheet, such a sheet containing 42 wt% of a 50/50 (weight ratio) mixture of chlorinated paraffin and di-n-octyl phthalate as a plasticizer was used and as a urethane type adhesive, AD-900 (polyester having OH groups at both terminals thereof) and hardener AD-RT 5 (aliphatic compound having isocyanate groups at both terminals thereof made by Toyo Morton Co., Ltd., mixing ratio of 100:15, which falls within B described above) was used. Both blocking property and slipping poperty of the coated composite film were good. Neither change in weight of the rigid polyvinyl chloride plate nor bleeding of the plasticizer onto the EVOH surface was noted. The adhesive strength between the layers was also sufficient. When the adhesive strength was measured by T type peeling, the polyvinyl chloride layer was destroyed. Water resistance property of the EVOH surface was also sufficient.

The weight change of the same acrylic copolymer film as used in Example 1 for purpose of comparison was 3.1 wt%. No stickiness was noted at the surface of the film.

Further for purpose of comparison, the coated film having the construction of A/B obtained using urethane type adhesive alone composed of AD-900 and hardener AD-RT 5 was obtained in a manner as described above. However, while the adhesive strength between the layers was sufficient because the polyvinyl chloride layer was destroyed, both blocking resistance and slipping property of the coated film were very unsatisfactory so that the coated film could not be provided for practical use.

EXAMPLE 5

A coated composite film was obtained in a manner similar to Example 1 except that a mixture (mixing ratio of 1:2 in a weight ratio) of tolylene diisocyanate (Coronate L, made by Nippon Polyurethane Industry Co.) and a polyester having the terminal glycols and having a molecular weight of about 800 was used as a urethane type adhesive. The coated composite film exhibited good blocking resistance and, slipping property was also good. Further no change in weight of the rigid polyvinyl chloride plate was noted. In addition, the adhesive strength of the layers was sufficient. When the adhesive strength was measured by T type peeling, the non-rigid polyvinyl chloride layer was destroyed.

EXAMPLE 6

Onto an EVOH film (unstretched) having the ethylene content of 31 mol% and a saponification degree of the vinyl acetate component of 99.2% and a thickness of 15μ was first coated 20 wt% of a solution of adhesives composed of urethane type adhesive AD 335 A and hardener Cat-10 (manufactured by Toyo Morton Co., Ltd.; mixing ratio of 17:1, which falls in B described above) and maleic anhydride-modified vinyl chloride-vinyl acetate copolymer adhesive MPR-TM (made by Nisshin Chemical Co., Ltd., which falls within C described above), having an C/B mixing ratio of 65/35 (by weight) in toluene/methyl ethyl ketone being ½ (weight ratio) having a solid content of 20 wt% in a thickness of 2 g/m² (solid basis), with a gravure coater. The coated film was dried at 110° C. for 1 minute. In order to examine blocking property of the obtained, coated composite film, the coated film was closely contacted with the EVOH film but non-coated under pressure of 50 g/cm², which was allowed to stand for 24 hours and the stickiness generated thereafter was examined to determine if it was an obstacle for practical use. No stickiness was noted and no problem occurred with blocking property. Further, the slipping property of the coated film was also good. After 50 days passed, the coated EVOH film was laminated onto the surface of a non-rigid polyvinyl chloride sheet of 0.3 mm thick containing 38 wt% of di-2-ethylhexyl phthalate by a heat lamination process (at 150° C.). The adhesive strength was measured by T type peeling but the non-rigid polyvinyl chloride layer was destroyed and, it was confirmed that the coated film had sufficient adhesive strength. Onto the EVOH surface of the non-rigid polyvinyl chloride sheet on which the aforesaid coated film had been laminated was put an unplasticized, rigid polyvinyl chloride plate (6 cm×6 cm, 2 mm thick) in close contact. In a state where a load of 2 kg was applied to the rigid polyvinyl chloride plate, the amount of bleeding of plasticizer was examined at a temperature of 70° C. Even 50 hours after, neither increase in the weight of the rigid polyvinyl chloride plate nor stickiness at the EVOH surface was noted but the prevention of bleeding of the plasticizer was perfect. Even by wiping operation with wet dustcloth, the surface was not impaired but sufficient water proofing property was exhibited.

For purpose of comparison, a sheet obtained by heat-laminating a film of acrylic copolymer composed of 86 mol% of methyl methacrylate and 14 mol% of butyl methacrylate, having the same thickness, onto the non-rigid polyvinyl chloride sheet was subjected to the tests in a similar manner. The change in weight of the rigid polyvinyl chloride plate was 3.2 wt% after 24 hours passed. It was confirmed that the weight change was based on the bleeding of the plasticizer. The stickiness at the surface of the copolymer film was also noted.

Further for purpose of comparison, an adhesive-coated EVOH film was obtained as described above, using, as an adhesive singly, AD-335 A and hardener Cat-10 (mixing ratio of 17:1) or MPR-TM. The coated film obtained using the urethane type adhesive alone composed of AD-335A and Cat-10 showed serious blocking and would not be suitable for practical use. The slipping property was also unsatisfactory. The coated film obtained using MPR-TM alone exhibited satisfactory blocking resistance and slipping property but the adhesive strength after heat lamination showed 0.28 kg/15 mm and the EVOH layer was peeled apart, which was unsatisfactory.

EXAMPLE 7

A coated composite film was obtained in a manner similar to Example 6 except that an EVOH film having the ethylene content of 43 mol% and a saponification degree of the vinyl acetate component of 99.3% was used and the resulting coated composite film was subjected to heat lamination under the temperature condition of 130° C. The heat-laminating composite film showed good blocking resistance and slipping property was also good. Further, no change in weight of the rigid polyvinyl chloride plate was noted. When the adhesive strength between the layers was measured with T type peeling, the non-rigid polyvinyl chloride layer was destroyed. Water resistance property of the EVOH surface was also sufficient.

EXAMPLE 8

EVOH (X) having the ethylene content of 26 mol% and a saponification degree of the vinyl acetate component of 99.5% and EVOH (Y) having the ethylene content of 51 mol% and a saponification degree of the vinyl acetate component of 99.3 mol% were fed into two extruders, respectively. Using a T-die for a binary layer, melt resins were contacted within the die at 220° C. to obtain a composite EVOH film having a thickness of the EVOH (X) layer of 6μ and a thickness of the EVOH (Y) layer of 9μ. Surface X of the composite EVOH film was heat-laminated so as to contact with non-rigid polyvinyl chloride in a manner similar to Example 6. As adhesives, an adhesive mixture of urethane type adhesive EPS-703A and catalyst KP-90 (made by Dai-Nippon Ink Co., Ltd., mixing ratio of 10:1, which falls within B described above) and MPR-TM used in Example 1 in an C/B mixing ratio (by weight) of 50/50 was used and as a non-rigid polyvinyl chloride sheet was used a non-rigid polyvinyl chloride sheet containing as a plasticizer 35 wt% of a 50/50 (weight ratio) mixture of di-n-octyl phthalate and tri-2-ethylhexyl phosphate. Heat lamination was carried out at the temperature of 125° C.

The coated EVOH film coated with the adhesive layer showed good blocking resistance and the slipping property was also good. The bleeding of the plasticizer was examined with a non-rigid polyvinyl chloride sheet having laminated thereon the EVOH film in a manner similar to Example 6. As a result, neither change in weight nor stickiness at the surface was noted. Further the adhesive strength between the layers was sufficient. When the adhesive strength was measured by T type peeling, the polyvinyl chloride layer was destroyed.

For purpose of comparison, the non-rigid polyvinyl chloride sheet having heat-laminated thereon the acrylic copolymer film used in Example 6 was obtained and subjected to the tests in a similar manner to examine the bleeding of the plasticizer. The increase in weight of the rigid polyvinyl chloride plate was 3.1 wt% 30 hours after.

Further for purpose of comparison, a coated EVOH film coated with the adhesive layer obtained using as an adhesive EPS-703 and catalyst KP-90 (mixing ratio of 15:1) singly was obtained. However, both blocking property and slipping property were poor and the film would not be suitable for practical use.

EXAMPLE 9

A coated composite film was obtained in a manner similar to Example 6 except that a biaxially stretched (area stretching magnification of 3×3 times) EVOH film having the ethylene content of 49 mol% and a saponification degree of the vinyl acetate component of 99.2% was used and as a non-rigid polyvinyl chloride sheet, such a sheet containing 39 wt% of a 50/50 (weight ratio) mixture of chlorinated paraffin and di-n- octyl phthalate as a plasticizer was used, and as a urethane type adhesive, AD-900 and hardener AD-RT 5 (made by Toyo Morton Co., Ltd., mixing ratio of 100:15, which falls within B described above) was used. Both blocking property and slipping poperty of the coated EVOH film were good. Neither change in weight of the rigid polyvinyl chloride plate nor bleeding of the plasticizer onto the EVOH surface was noted. The adhesive strength between the layers was also sufficient. When the adhesive strength was measured by T type peeling, the polyvinyl chloride layer was destroyed. Water proofing property of the EVOH surface was also sufficient.

The weight change of the same acrylic copolymer film as used in Example 6 for purpose of comparison was 3.1 wt%. No stickiness was noted at the surface of the film.

Further for purpose of comparison, an EVOH film in which the adhesive layer was coated using as an adhesive urethane type adhesive alone composed of AD-900 and hardener AD-RT 5 alone was obtained. While the adhesive strength was sufficient (the polyvinyl chloride layer was destroyed), the blocking resistance of the coated EVOH film was very unsatisfactory so that the film would not be suitable for practical use.

EXAMPLE 10

A heat-laminating composite film was obtained in a manner similar to Example 6 except that a mixture (mixing ratio of 1:2 in a weight ratio) of tolylene diisocyanate (Coronate L, made by Nippon Polyurethane Industry Co.) and a polyester having the terminal glycols and having a molecular weight of about 800 was used as a urethane type adhesive. The heat-laminating composite film exhibited good blocking resistance and, slipping property was also good. Further any change in weight of the rigid polyvinyl chloride plate was not noted. In addition, the adhesive strength between the layers was sufficient. When the adhesive strength was measured by T type peeling, the non-rigid polyvinyl chloride layer was destroyed. Water proofing property was sufficient when stains at the EVOH surface were cleaned.

EXAMPLE 11

Heat-laminating EVOH film was obtained in a manner similar to Example 6 except that vinyl chloride (80 mol%)-vinyl acetate (17 mol%)-ethyl acrylate (3 mol%) copolymer adhesive was used in stead of maleic anhydride (1 mol%)-modified vinyl chloride (86 mol%)-vinyl acetate (13 mol%) copolymer adhesive MPR-TM.

Thus obtained, coated EVOH film was closely contacted with the EVOH film but non-coated under pressure of 50 g/cm$^2$ which was allowed to stand for 24 hours and the stickness generated thereafter was examined to determine if it was an obstacle for practical use. No stickiness was noted and no problem occurred with blocking property. Further, the slipping property of the coated film was also good. After 50 days passed, the coated EVOH film was laminated onto the surface of a non-rigid polyvinylchloride sheet of 0.3 mm thick containing 38 wt% of di-ethylhexyl phthalate by a heat lamination process (at 150° C.).

The adhesive strength was measured by T type peeling but the non-rigid polyvinyl chloride layer was destroyed and it was confirmed that the coated film had sufficient adhesive strength.

What is claimed is:

1. A heat-laminatable composite film comprising (A) a saponified product of an ethylene-vinyl acetate copolymer having an ethylene content of 20 to 60 mol% and a saponificaton degree of the vinyl acetate component of not less than 95%, (B) a reactive polyurethane containing isocyanate groups and (C) a vinyl chloride copolymer containing 60 to 99 mol% of the vinyl chloride component and 40 to 1 mol% of a vinyl acetate and/or (meth)acrylate component, said film, having a layer construction of either Layer A/Layer B/Layer C or Layer A/Layer of a mixture of B and C.

2. A composite film according to claim 1 wherein said saponified product of an ethylene-vinyl acetate copolymer (A) has an ethylene content of 25 to 50 mol%.

3. A composite film according to claim 1 wherein Layer A comprises a binary layer of a layer of a saponified product of an ethylene-vinyl acetate copolymer having an ethylene content of 20 to 35 mol% and a layer of a saponified product of an ethylene-vinyl acetate copolymer having an ethylene content of 40 to 60 mol%, the former layer being positioned adjacent Layer B or the Layer of a mixture of B and C.

4. A composite film according to claim 1 having a layer construction of Layer A/Layer B/Layer C.

5. A composite film according to claim 4 wherein the thickness of Layer A is 5 to 50$\mu$, the thickness of Layer B is 0.5 to 10$\mu$ and the thickness of Layer C is 1 to 10$\mu$.

6. A composite film according to claim 1 comprising a layer of a mixture of (B) and (C) in a C/B mixing ratio of $\frac{1}{2}$ to 6.

7. A composite film according to claim 6 wherein the thickness of said Layer A is 5 to 50$\mu$ and the thickness of said Layer of a mixture of B and C is 1 to 10$\mu$.

8. A laminated material which comprises heat-laminating a composite film comprising (A) a saponified product of an ethylene-vinyl acetate copolymer having the ethylene content of 20 to 60 mol% and a saponification degree of the vinyl acetate component of not less than 95%, (B) a reactive polyurethane containing isocyanate groups and (C) a vinyl chloride copolymer containing 60 to 99 mol% of the vinyl chloride component and 40 to 1 mol% of a vinyl acetate component and/or a (meth)acrylate, component, said film having a layer construction of either Layer A/Layer B/Layer C or Layer A/Layer of a mixture of B and C, onto at least one surface (D) of plasticized polyvinyl chloride in such a manner that Layer D is positioned adjacent Layer C or adjacent the Layer of said mixture of B and C.

9. A laminated material of claim 8 wherein said Layer (D) of plasticized polyvinyl chloride is a polyvinyl chloride layer containing 25 to 55 wt% of a plasticizer which is liquid at 20° C. based on the total weight.

10. A heat-laminatable composite film comprising (A) layer of a saponified product of an ethylene vinyl acetate copolymer having an ethylene content of 20 to 60 mole % and a saponification degree of the vinyl acetate component of not less than 95%, coated with (B), a solution of a reactive polyurethane containing isocyanate groups and (C), a solution of a vinyl chloride copolymer containing 60 to 99 mol % of the vinyl chloride component and 40 to 1 mole % of a vinyl acetate and/or (meth)acrylate component, said composite film having a layered construction of either Layer A/Layer B/Layer C or Layer A/Layer of a mixture of B+C.

11. A heat-laminatable composite film according to claim 10, wherein the thickness of layer A is 5 to 50$\mu$, the thickness of layer B is 0.5 to 10$\mu$, and the thickness of layer C is 1 to 10μ or the thickness of the layer of the mixture of B and C is 1 to 10μ.

12. A laminated material which comprises a composite film comprising (A) a layer of a saponified product of an ethylene-vinyl acetate copolymer having an ethylene content of 20 to 60 mol% and a saponification degree of the vinyl acetate component of not less than 95%, coated with (B), a solution of a reactive polyurethane containing isocyanate groups and (C), a solution of a vinyl chloride copolymer containing 60 to 99 mol% of the vinyl chloride component and 40 to 1 mol% of a vinyl acetate component and/or a (meth)acrylate component, said composite film having a layered construction of either Layer A/Layer B/Layer C or Layer A/Layer of a mixture of B+C, heat laminated onto at least one surface of a layer (D) of plasticized polyvinyl chloride so that layer D is adjacent layer C of the layer of a mixture of B and C.

13. A laminated material according to claim 12, wherein layer D is a polyvinyl chloride layer containing 25 to 55 wt% based on the total weight of a plasticizer which is liquid at 20° C.

* * * * *

UNITED STATES PATENT AND TRADEMARK OFFICE
CERTIFICATE OF CORRECTION

PATENT NO. : 4,684,564

DATED : August 4, 1987

INVENTOR(S) : Kenji Satoh, et al

It is certified that error appears in the above-identified patent and that said Letters Patent is hereby corrected as shown below:

On the cover sheet, in the Foreign Application Priority Data section, the second listed priority document number "56-99451" should read -- 59-99451 -- .

In Claim 6, line 3 thereof, "1/2" should read -- 2/3 -- .

Signed and Sealed this

Twenty-fourth Day of November, 1987

Attest:

DONALD J. QUIGG

*Attesting Officer*     *Commissioner of Patents and Trademarks*